United States Patent
Okawa et al.

(10) Patent No.: US 7,636,811 B2
(45) Date of Patent: Dec. 22, 2009

(54) CACHE MEMORY AND METHOD OF CONTROLLING MEMORY

(75) Inventors: Tomoyuki Okawa, Kawasaki (JP); Mie Tonosaki, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 10/995,183

(22) Filed: Nov. 24, 2004

(65) Prior Publication Data

US 2006/0026356 A1 Feb. 2, 2006

(30) Foreign Application Priority Data

Jul. 29, 2004 (JP) ............................. 2004-222402

(51) Int. Cl.
*G06F 12/00* (2006.01)

(52) U.S. Cl. .................... 711/128; 711/118; 711/133; 711/145

(58) Field of Classification Search ............... 711/128, 711/118, 133, 145
See application file for complete search history.

(56) References Cited

U.S. PATENT DOCUMENTS

| 5,367,653 | A | * | 11/1994 | Coyle et al. ............... 711/128 |
| 5,809,535 | A | | 9/1998 | Tanioka |
| 5,983,322 | A | | 11/1999 | Arimilli et al. |
| 6,145,055 | A | | 11/2000 | Fujimoto |
| 6,470,425 | B1 | * | 10/2002 | Yamashiroya ............... 711/133 |
| 6,848,024 | B1 | * | 1/2005 | Rowlands et al. ........... 711/128 |
| 2004/0088682 | A1 | * | 5/2004 | Thompson et al. .......... 717/124 |
| 2005/0198442 | A1 | * | 9/2005 | Mandler ..................... 711/145 |

FOREIGN PATENT DOCUMENTS

| EP | 0 549 508 | 6/1993 |
| JP | 63-259748 | 10/1988 |
| JP | 05-241962 | 9/1993 |
| JP | 5-241962 | 9/1993 |
| JP | 2001-216193 | 8/2001 |

OTHER PUBLICATIONS

Communication from the European Patent Office dated Nov. 2, 2007 for corresponding European Patent Application No. 04257449.1-1229.

* cited by examiner

*Primary Examiner*—Tuan V Thai
*Assistant Examiner*—Yong Choe
(74) *Attorney, Agent, or Firm*—Staas & Halsey

(57) ABSTRACT

A cacheable memory access space receives memory access addresses having different data structures according to a status of a cache capacity from a processor. A cache hit detector determines whether data has been hit based on a mode signal, an enbblk [n] signal, and a signal indicating whether the way is valid or invalid, which are preset in the cache hit detector, a tag comparison address received from the cacheable memory access space, and a tag received from the storage unit.

5 Claims, 8 Drawing Sheets

US 7,636,811 B2

CACHE MEMORY AND METHOD OF CONTROLLING MEMORY

BACKGROUND OF THE INVENTION

1) Field of the Invention

The present invention relates to a cache memory and the like that utilizes a set associative method having a plurality of ways, and delivers data to a processor according to a request from the processor, and more particularly, to a cache memory that enables the cache capacity to be condensed without a reduction in performance during an application, and a method of controlling the memory.

2) Description of the Related Art

As a central processing unit (CPU) has become faster in recent years, there has been a problem that the processing speed of a main memory cannot keep up with the CPU, which temporarily stops processing while accessing data in the main memory, and shifts to standby, resulting in memory delay.

Accordingly, many systems include a high-speed cache memory between the CPU and the main memory, in order to relieve the speed difference between them. There are many types of cache memory associative methods, such as a direct mapping method, a full associative method, and a set associative method. Among these, the set associative method is most widely used.

In the set associative method, the cache line is divided into a plurality of ways, and each way is directly mapped. Generally, the greater the number of ways is, the more the hit rate increases.

In consideration of the manufacturing yield and the like of large-scale integration (LSI) in techniques relating to conventional set associative methods, when a defect occurs in the cache memory, the function of the way that includes the defect is terminated, and use of the unit where the defect occurred is avoided.

The cache mechanism described in Japanese Patent Application Laid-open Publication No. 2001-216193 discloses a technique for increasing the cache efficiency by changing the line size, this being the size of the block data, and the cache memory system described in Japanese Patent Application Laid-open Publication No. H5-241962 discloses a technique for efficiently reconfiguring the cache memory.

However, the conventional technology has a problem that, when condensing the cache capacity while there is a defect or the like inside the cache memory, the performance during actual application deteriorates since the functions of the corresponding way are terminated.

In a cache memory that uses a set associative method utilizing several hundreds to several tens of ways, no particular problems are caused by terminating the functions of a way where a defect or the like exists. However, since many cache memories, which are designed for general personal computers (PC), use a set associative method with only four ways, terminating the function of a way that handles the set associative method results in a noticeable reduction in performance during application.

SUMMARY OF THE INVENTION

It is an object of the present invention to solve at least the above problems in the conventional technology.

A cache memory according to one aspect of the present invention employs a set associative method including a plurality of ways, and passes data to a processor according to a request from the processor. When condensing a cache capacity, the cache memory terminates a function in a way direction or a line direction of a storage unit that stores the data.

A cache memory according to another aspect of the present invention includes an access-address acquiring unit that acquires an access address that includes a line address of a position of data requested by a processor, and a tag comparison address that determines whether the data specified by the line address is valid; and a determination processing unit that determines whether the data requested by the processor has been hit, based on statuses of the access address and each of a plurality of ways.

A method of controlling a memory according to still another aspect of the present invention includes acquiring unit an access address that includes a line address of a position of data requested by a processor, and a tag comparison address that determines whether the data specified by the line address is valid; and determining whether the data requested by the processor has been hit, based on statuses of the access address and each of a plurality of ways.

The other objects, features, and advantages of the present invention are specifically set forth in or will become apparent from the following detailed description of the invention when read in conjunction with the accompanying drawings.

DETAILED DESCRIPTION

Exemplary embodiments of a cache memory and method of controlling a memory according to the present invention will be explained below in detail with reference to the accompanying drawings.

The cache memory according to the present embodiment is an n-way (n>1) set associative cache memory that, when a defect occurs in a block and the cache capacity is reduced, terminates function in the line direction, thereby condensing the cache capacity without reducing the number of ways.

Figure 1:
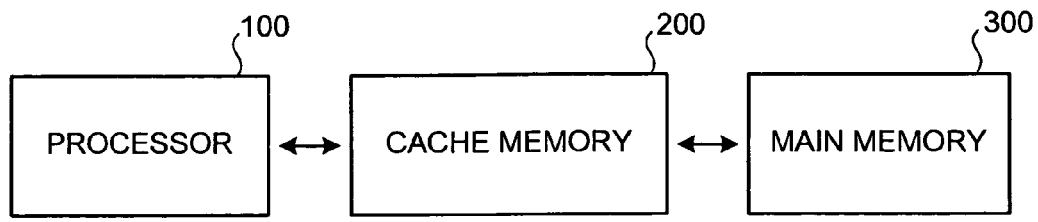
FIG. 1 is a diagram of a cache memory according to an embodiment of the present invention.

The cache memory according to this embodiment can be included inside a processor, or appended to the processor. However, as shown in FIG. 1, the explanation below describes an example of a system in which a cache memory 200 is directly connected to a processor 100, and a main memory 300 is accessed via the cache 200.

Figure 2:
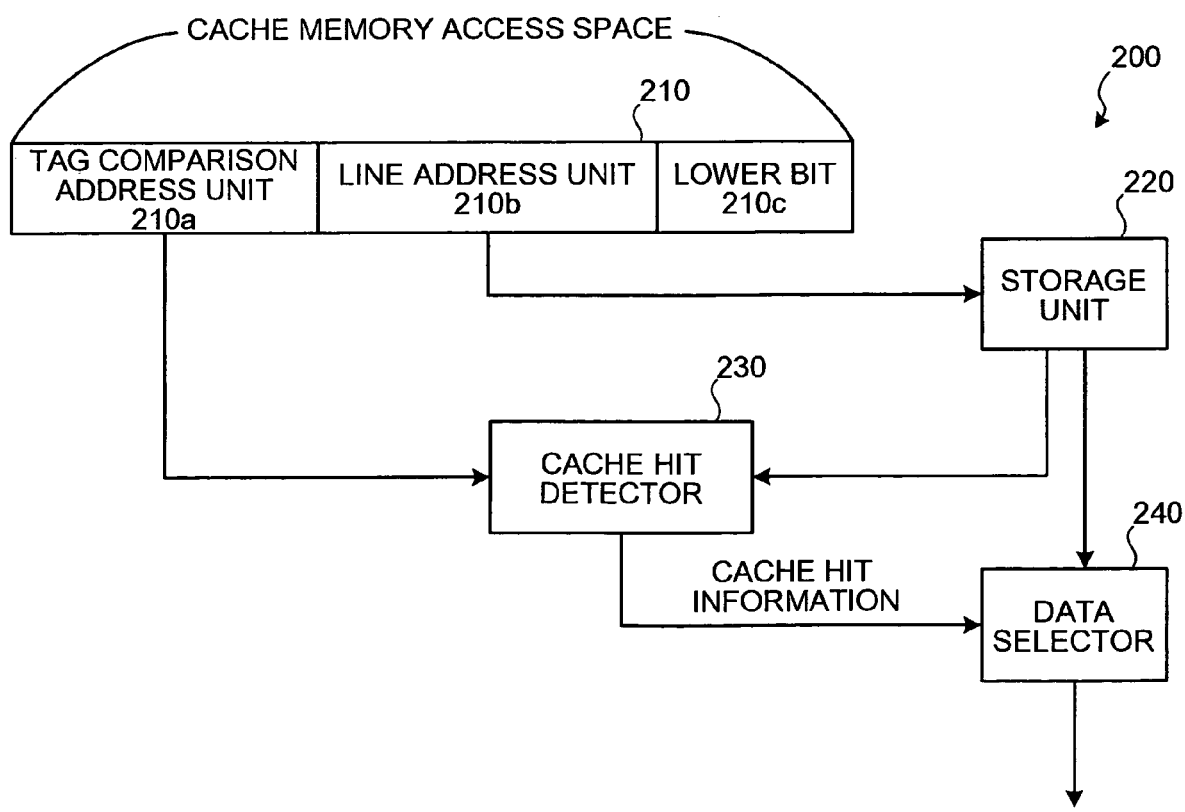
FIG. 2 is a functional block diagram of the constitution of the cache memory according to the embodiment.

FIG. 2 is a function block diagram of the constitution of the cache memory 200 according to this embodiment. As shown in FIG. 2, the cache memory 200 includes a cacheable memory access space 210, a storage unit 220, a cache hit detector 230, and a data selector 240.

The cacheable memory access space 210 receives a memory access address from the processor 100. The memory access address received from the processor 100 when using the entire cache capacity of the storage unit 220 (explained later) is different from that when condensing the cache capacity in the line direction.

Figure 3:
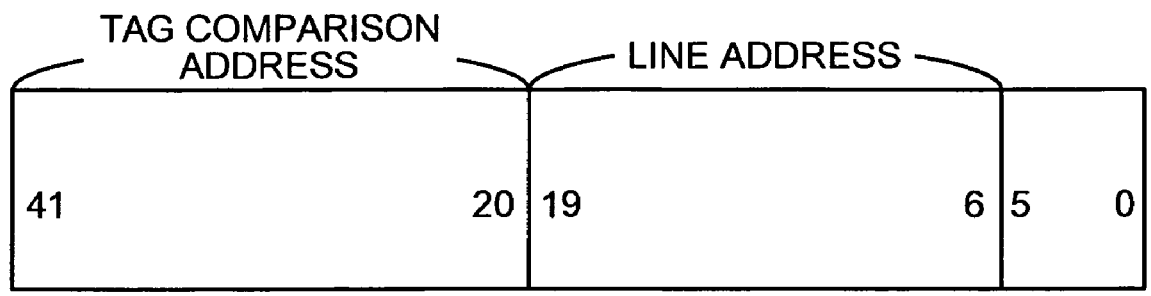
FIG. 3 is an example of a memory access address when the entire cache capacity is used.

FIG. 3 is an example of the memory access address when the entire cache capacity is used. As shown in FIG. 3, the memory access address includes a total of forty-two bits, those from the forty-first bit to the twentieth bit forming a tag comparison address, and those from the nineteenth bit to the sixth bit forming a line address. Although this embodiment describes an example where the memory access address includes forty-two bits, the constitution is not restricted to this.

The line address is used in specifying the position of data in the storage unit 220, and the tag comparison address is information used in determining whether data that has been specified by the line address is data searched by the processor 100.

Figure 4:
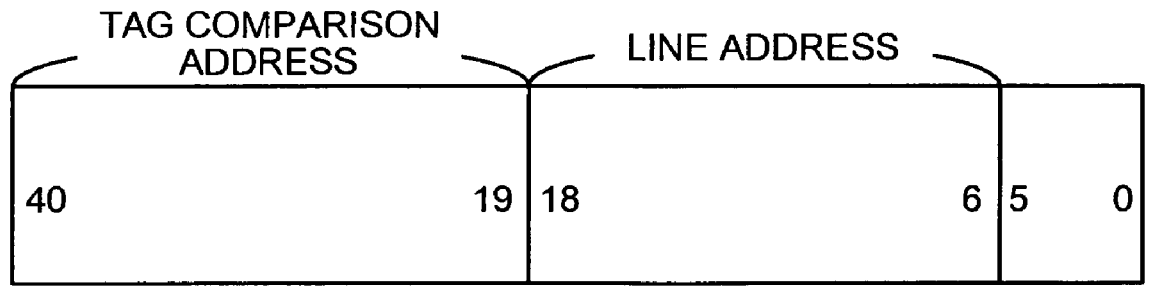
FIG. 4 is an example of a memory access address when the cache capacity is condensed in the line direction.

FIG. 4 is an example of the memory access address when the cache capacity is condensed in the line direction. As shown in FIG. 4, the memory access address includes forty-one bits, those from the fortieth bit to the nineteenth bit forming the tag comparison address, and those from the eighteenth bit to the sixth bit forming the line address. The difference between the memory access address shown in FIG. 3 and the memory access address shown in FIG. 4 is the matter of whether the nineteenth bit is included in the line address or in the tag comparison address.

As will be explained later, the nineteenth bit of the line address when using the entire cache capacity is used to select a block included in the storage unit 220.

The cacheable memory access space 210 stores a tag comparison address and a line address, that are included in the received memory access address, in a tag comparison address unit 210a and a line address unit 210b respectively. Other information is stored in a lower bit 210c.

The tag comparison address that is stored in the tag comparison address unit 210a is passed to the cache hit detector 230 (explained later), and the line address that is stored in the line address unit 210b is passed to the storage unit 220.

The storage unit 220 will be explained. The storage unit 220 holds a plurality of ways that are divided into blocks. There is a plurality of lines in each block, and data are stored in each line. The total amount of data is calculated by multiplying the number of lines in the storage unit 220 by the number of ways. This embodiment is an example where each way is divided into two blocks, but the present invention is equally applicable when each way is divided into more than two blocks.

Figure 5:
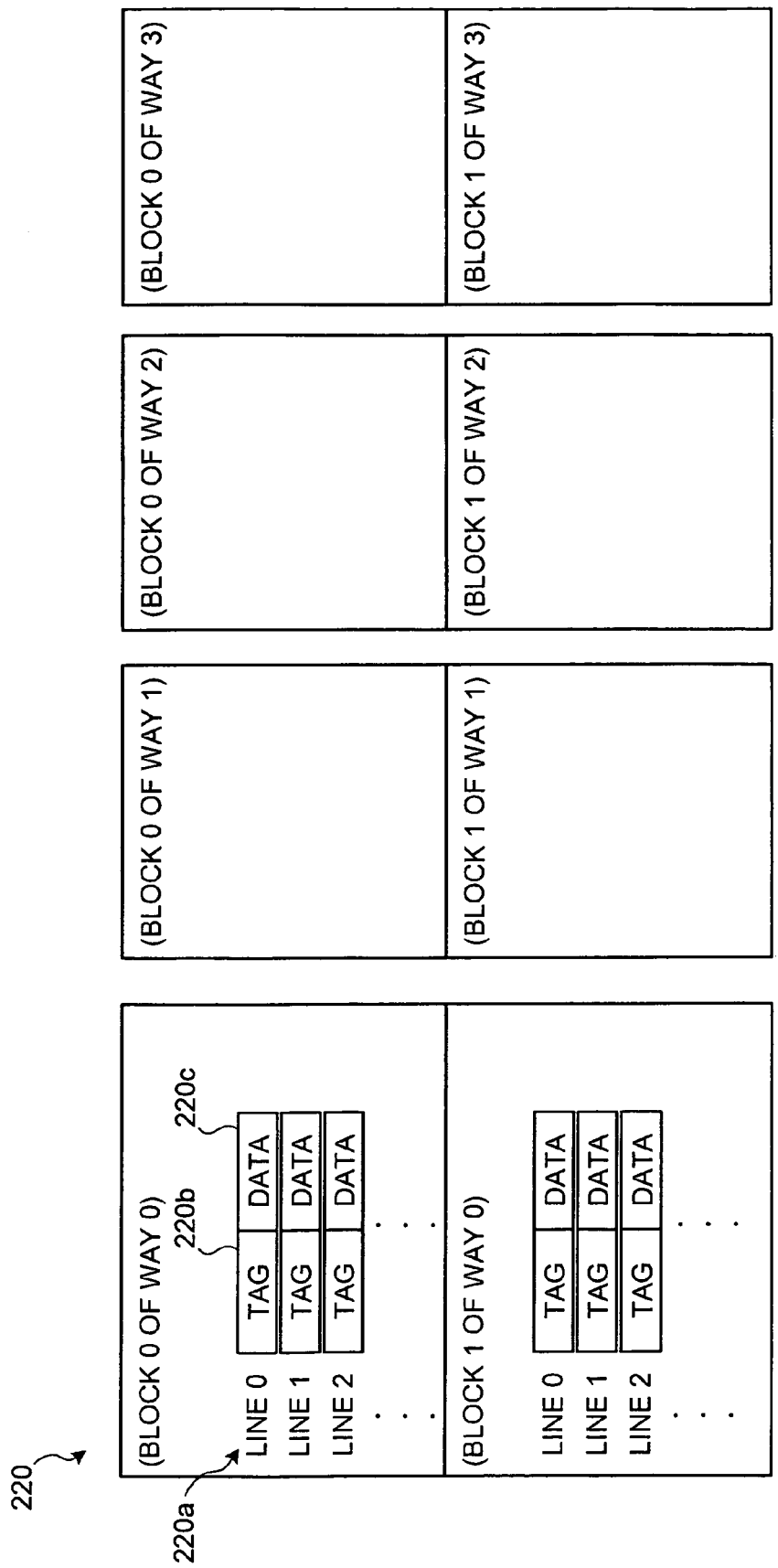
FIG. 5 is an example of the data structure of a storage unit.

FIG. 5 is an example of the data structure of the storage unit 220. As shown in FIG. 5, the storage unit 220 includes block 0 and block 1 of way 0, block 0 and block 1 of way 1, block 0 and block 1 of way 2, and block 0 and block 1 of way 3. For sake of convenience, FIG. 5 depicts a case where four ways (ways 0 to 3) are held, but the storage unit 220 can hold any number of ways.

Each block has a line address 220a, a tag 220b, and data 220c, for each line. The line address 220a is information of the position of the corresponding tag 220b and data 220c. The line address 220a is passed from the cacheable memory access space 210.

A tag that corresponds to the same line address as that passed from the cacheable memory access space 210 is passed to the cache hit detector 230. When the entire cache capacity is to be used, it is determined whether to use the block 0 of each way, or block 1, by referring the value of the head bit in the line address.

Figure 6:
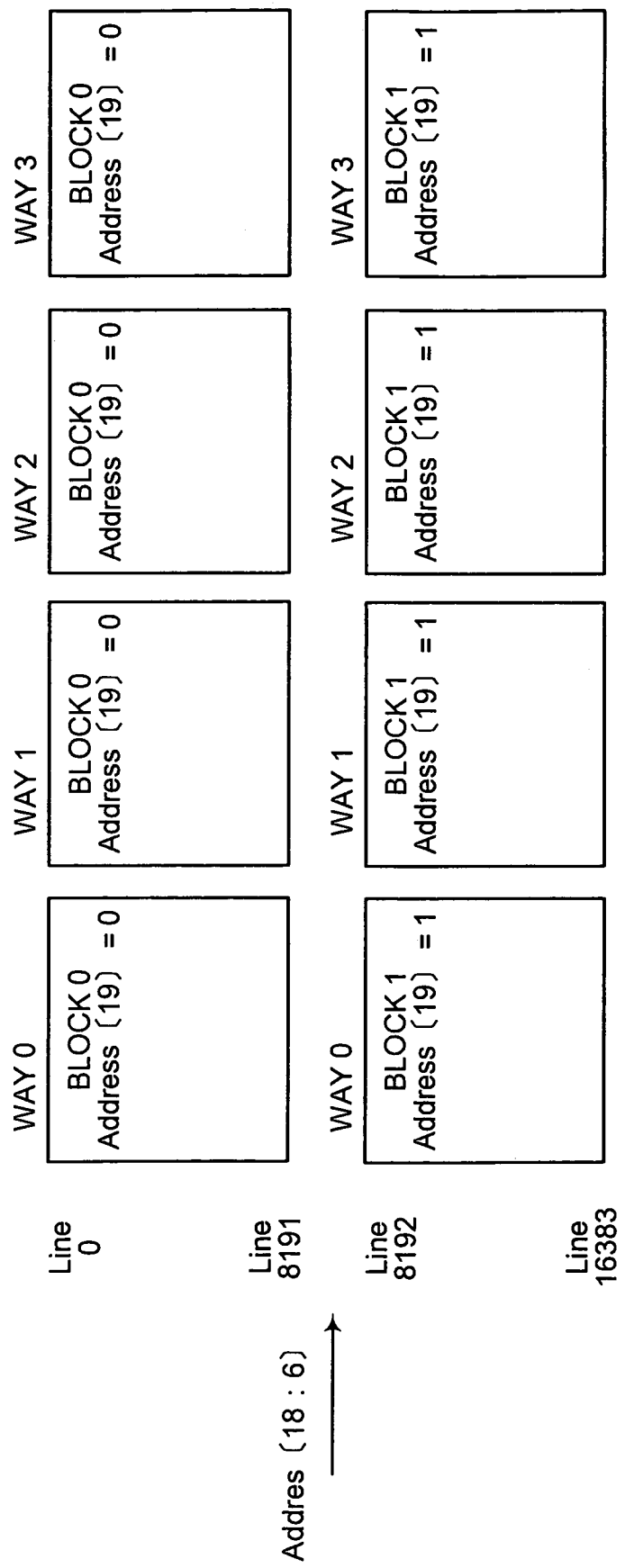
FIG. 6 is an example of the layout when the entire cache capacity is used.

More specifically, when the value of the head bit in the line address is "1", block 1 is used, and, when the value of the head bit in the line address is "0", block 0 is used. FIG. 6 is an example of the layout when the entire cache capacity is used. In this case, since the head address of the line address is used to specify the block, the corresponding tag is searched by using the remainder of the address after the head address has been deleted.

On the other hand, when condensing the cache capacity in the line direction, a signal known as enbblk [n] is used for each way. Here, n stores information for specifying each way (n=0 representing way 0, n=1 representing way 1, n=2 representing way 2, and n=3 representing way 3). The signal enbblk [n] can be used in avoiding blocks that cannot be used due to a manufacturing fault or the like.

Figure 7:
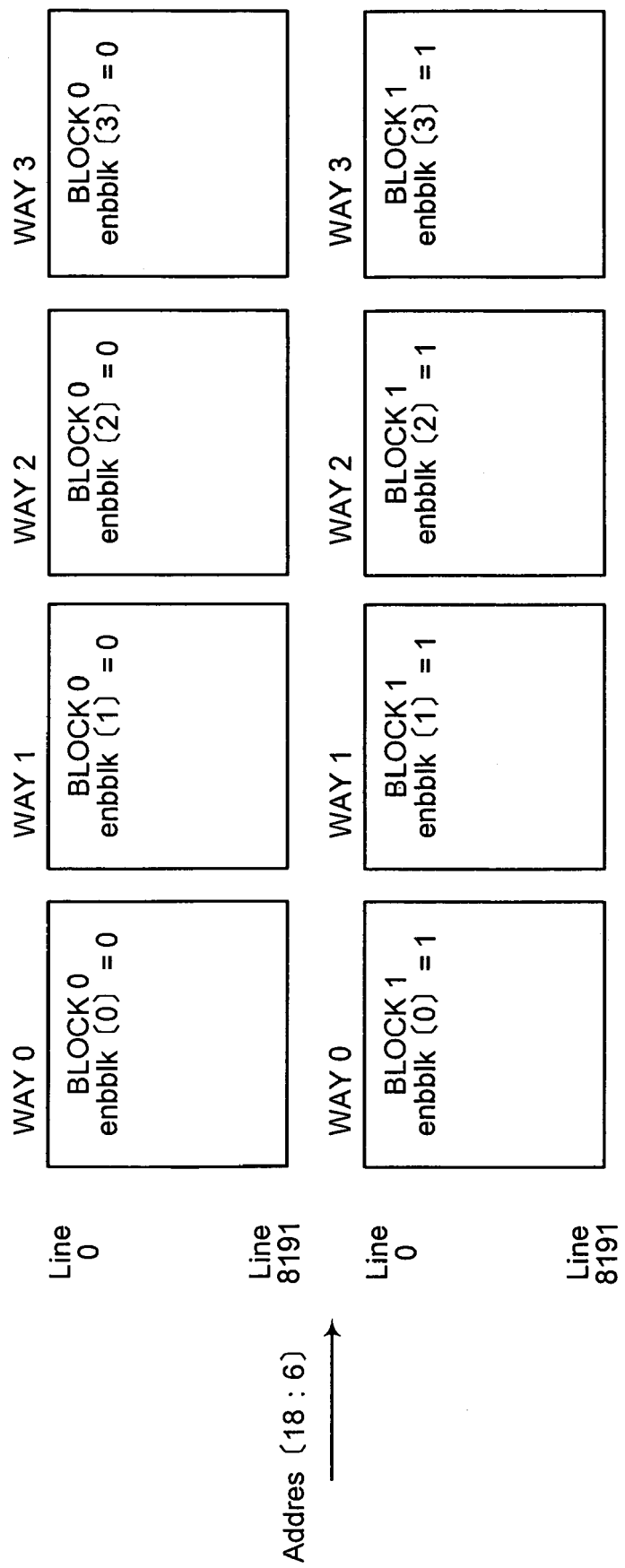
FIG. 7 is an example of the layout when the cache capacity is condensed in the line direction.

For example, when there is a defect in block 0 of way 0, use of block 0 of way 0 can be avoided by setting enbblk [0] to "1". Similarly, when there is a defect in block 1 of way 2, use of block 1 of way 2 can be avoided by setting enbblk [2] to "0". FIG. 7 is an example of the layout when the cache capacity is condensed in the line direction. The signal enbblk [n] is set beforehand in the cache hit detector 230.

Figure 8:
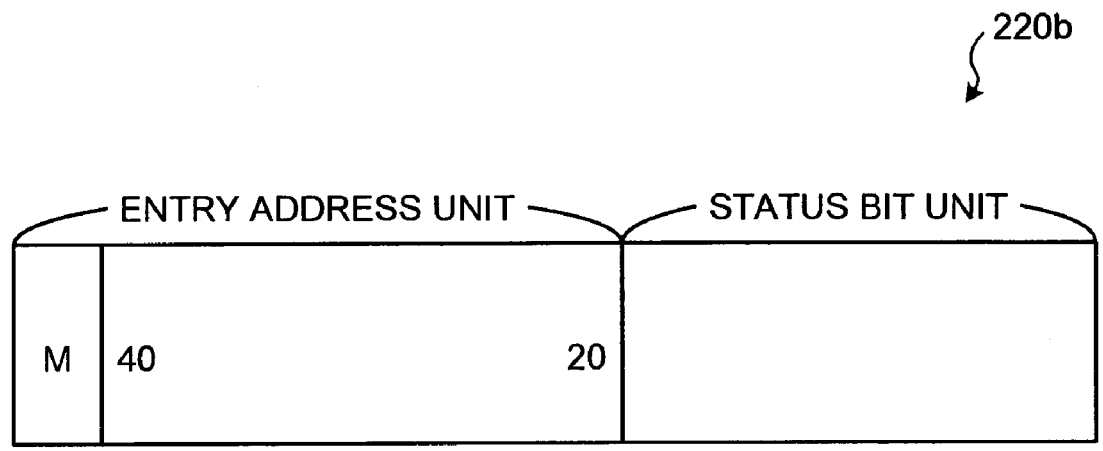
FIG. 8 is a diagram of an example of the data structure of a tag.

The tag 220b is transmitted directly to the cache hit detector 230, and an entry address included in the tag 220b is compared with the tag comparison address. FIG. 8 is an example of the data structure of the tab 220b.

As shown in FIG. 8, the tag 220b has an entry address unit and a status bit unit. The tab 220b includes a total of twenty-two bits, those from the forty-first bit to the twentieth bit forming the entry address unit, and the rest forming the status bit unit.

The uppermost bit in the entry address is termed "M". The bit that corresponds to "M" when using the entire cache capacity is different from that when condensing the cache capacity in the line direction. Specifically, when using the entire cache capacity, "M" corresponds to the forty-first bit, and, when condensing the cache capacity in the line direction, "M" corresponds to the nineteenth bit.

When using the entire cache capacity, the entry address is formed by the forty-first bit to the twentieth bit, but, when condensing the cache capacity in the line direction, the entry address is formed by the fortieth bit to the nineteenth bit. By using "M", there is no need to change the region of the entry address unit that is used, and consequently, there is no need to redesign the entry address unit relating to the cache memory, enabling costs to be reduced.

The status bit unit includes information indicating whether the corresponding tag is valid. This information indicating whether the tag is valid is used as a tag valid by the cache hit detector 230.

Subsequently, the cache hit detector 230 will be explained. The cache hit detector 230 according to this embodiment compares a tag comparison address, passed from the cacheable memory access space 210, with entry addresses or the like included in the tags of the ways in the storage unit 220, determines whether the corresponding data has been hit, and passes the detection result to the data selector 240.

The cache hit detector 230 includes a hit detector circuit and a tag valid corresponding signal creator circuit. The cache hit detector 230 uses the hit detector circuit and the tag valid corresponding signal creator circuit to determine whether the corresponding data has been hit.

Figure 9:
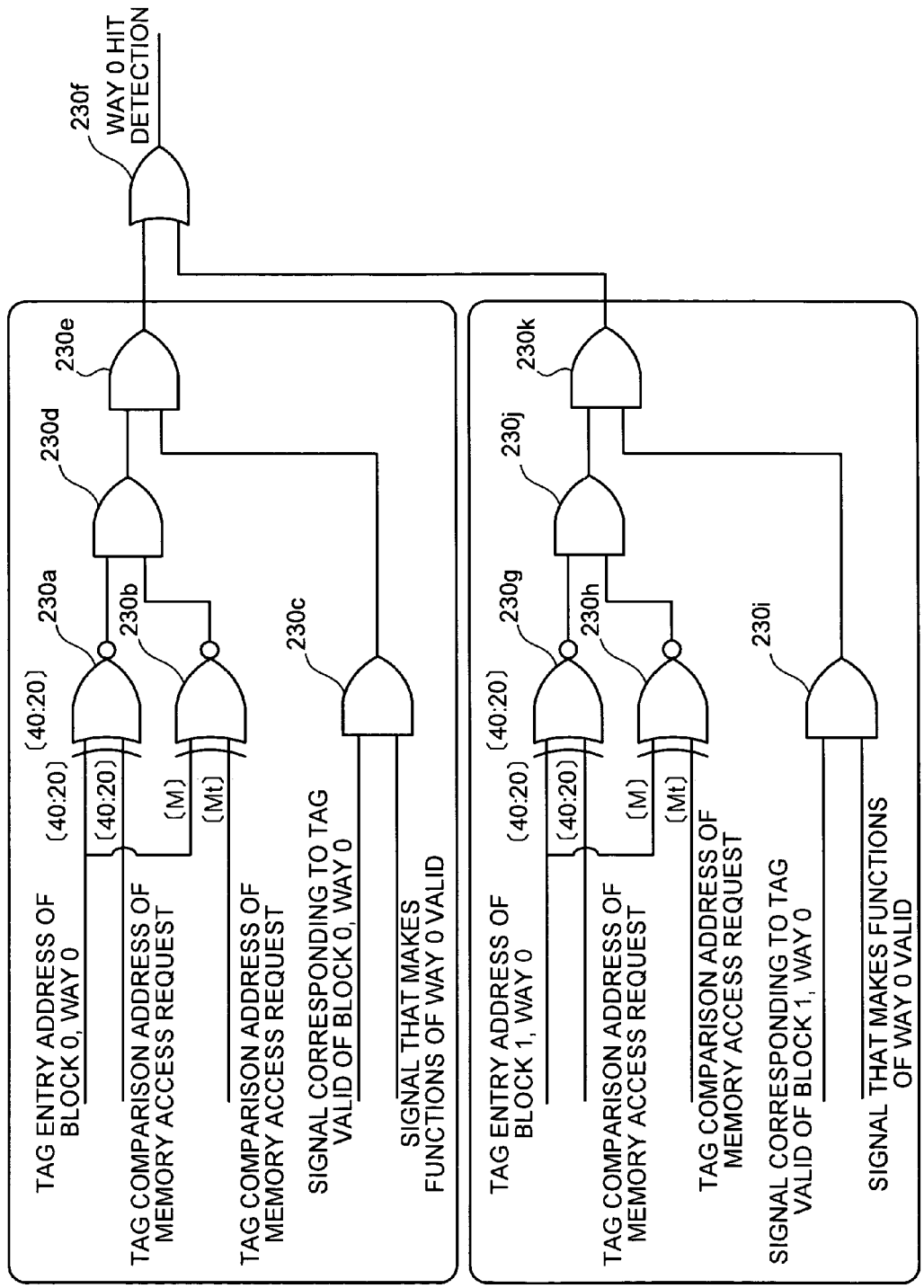
FIG. 9 is a diagram of an example of a hit detector circuit.

FIG. 9 is an example of the hit detector circuit. While in this example, the hit detector circuit determines whether there has been a hit for way 0, it can also be determined whether data has been hit for ways 1 to 3 by providing similar hit detector circuits for them.

As shown in FIG. 9, the hit detector circuit includes a plurality of XOR calculators, an AND calculator, and an OR calculator. An inverter is attached to the output of the XOR calculators, inverting the values output therefrom.

As shown in FIG. 9, the tag entry address (the fortieth bit to the twentieth bit among the twenty-one bits of the tag) of block 0 of way 0, and the tag comparison address (the fortieth bit to the twentieth bit among the forty-one bits of the tag) of a memory access request, are input to the XOR calculator 230*a*.

The XOR calculator 230*a* then performs an XOR computation based on the tag entry address and the tag comparison address. The computed value is inverted by the inverter and input to the AND calculator 230*d*. More specifically, when the computed value is "1", an inverted value "0" thereof is input to the AND calculator 230*d*.

The uppermost address "M" relating to the tag entry address of block 0 of way 0, and a value "Mt" corresponding to the status of use of the cache capacity of the tag comparison address of the memory access request, are input to the XOR calculator 230*b*. Specifically, when using the entire cache capacity, the head bit of the tag comparison address is input as "Mt".

On the other hand, when condensing the cache capacity in the line direction, the last bit of the tag comparison address is input as "Mt". That is, when using the entire cache capacity, the forty-first bit relating to the memory access address is input as "Mt", whereas when condensing the cache capacity in the line direction, the nineteenth bit relating to the memory access address is input as "Mt".

The XOR calculator 230*b* then performs an XOR calculation based on the "M" of the tag entry address and the "Mt" of the tag comparison address. The value of the computed result is inverted by the inverter, and input to the AND calculator 230*d*.

A signal corresponding to the tag valid, which is created by a tag valid corresponding signal creator circuit (explained later), and a signal that makes the function of the way 0 valid, are input to the AND calculator 230*c*. When making the function of the way 0 valid, "1" is input, and when making the function of way 1 invalid, "0" is input. The question of whether to make the function of way 0 valid is determined beforehand and set in the cache hit detector 230.

A value obtained when the inverter inverts the value output from the XOR calculator 230*a*, and a value obtained when the inverter inverts the value output from the XOR 230*b*, are input to the AND calculator 230*d*. The AND calculator 230*d* then performs an AND computation based on the values that are input from the XOR calculators 230*a* and 230*b*, and the computed result is input to an AND calculator 230*e*.

The AND calculator 230*e* receives the values that are output from the AND calculator 230*d* and the AND calculator 230*c*, and performs an AND computation based on the received values. The computed result is input to an OR calculator 230*f*.

An XOR calculator 230*g*, an XOR calculator 230*h*, an AND calculator 230*i*, an AND calculator 230*j*, and an AND calculator 230*k*, have approximately the same constitutions as the XOR calculator 230*b*, the AND calculator 230*c*, the AND calculator 230*d*, and the AND calculator 230*e*, and therefore they will not be further explained.

The OR calculator 230*f* performs an OR computation based on values input thereto from the AND calculator 230*e* and the AND calculator 230*k*, and outputs the computed result. A value of "1" output from the OR calculator 230*f* indicates a hit, and a value of "0" indicates a miss. The cache hit detector 230 notifies the data selector 240 (explained later) as to whether the corresponding data is hit.

FIG. 9 depicts a hit detector circuit relating to way 0, but hit detection can be carried out for ways 1 to 3 by using similar hit detector circuits. Explanations of the hit detector circuits for ways 1 to 3 are omitted here.

Figure 10:
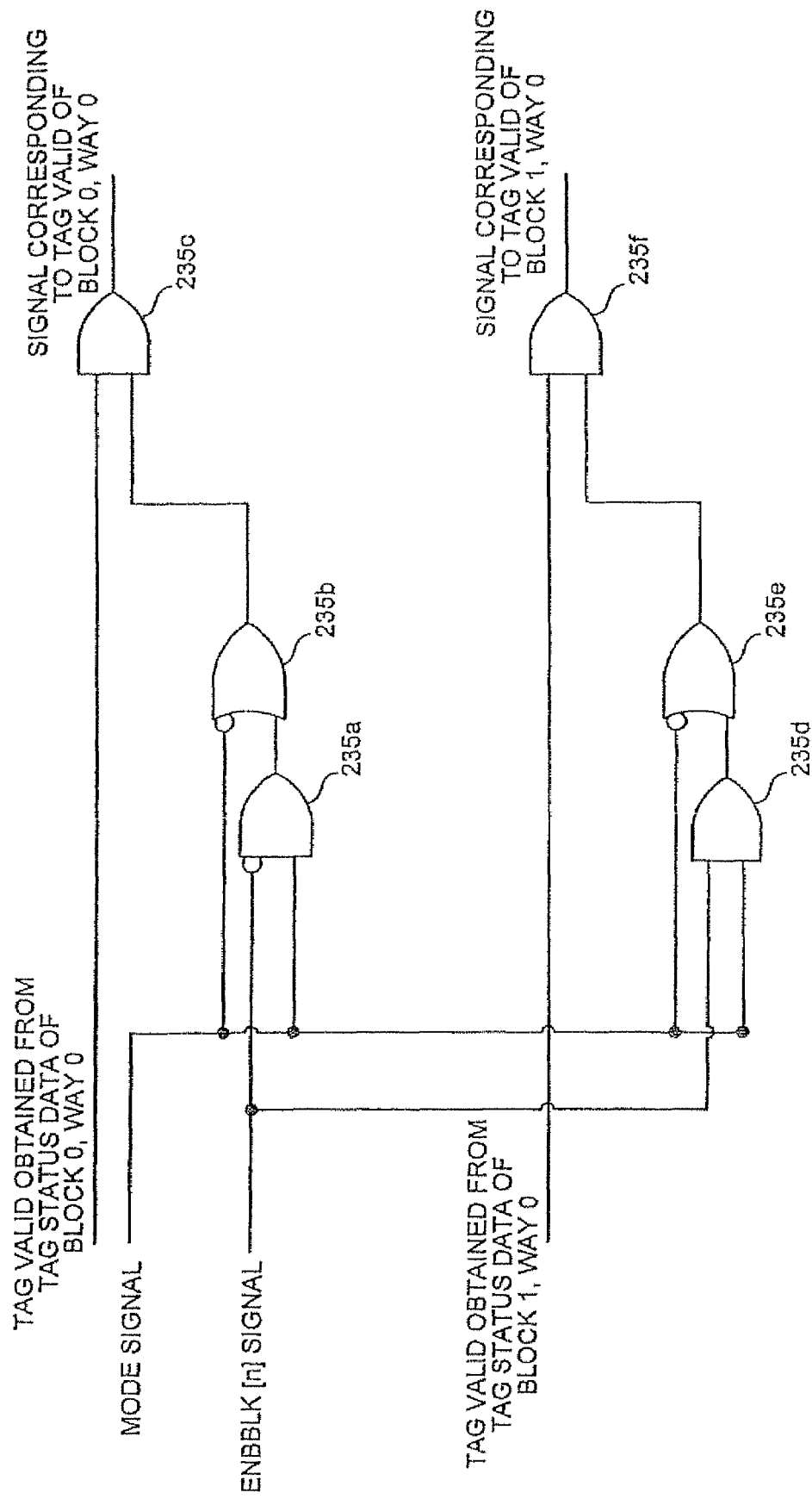
FIG. 10 is a diagram of an example of a tag valid corresponding signal creator circuit.

Subsequently, a tag valid corresponding signal creator circuit that creates the signal corresponding to the tag valid shown in FIG. 9 will be explained. FIG. 10 is an example of a tag valid corresponding signal creator circuit. As shown in FIG. 10, this tag valid corresponding signal creator circuit includes a plurality of AND calculators and OR calculators.

An AND calculator 235*a* receives a value obtained by inverting the enbblk [n] mentioned earlier, and a signal in a mode relating to the status of use of the cache capacity (hereinafter, "mode signal"), performs an AND computation based on the received values, and inputs the computed result to an OR calculator 235*b*. The enbblk [n] relating to way 0 is enbblk [0].

The value of "0" is input as the mode signal when using the entire cache capacity, and a value of "1" is input when condensing the cache capacity in the line direction. The mode signal is set beforehand in the cache hit detector 230. The OR calculator 235*b* performs an OR computation based on a value obtained by inverting the mode signal, and the value input from the OR calculator 235*a*, and outputs the numerical value of the computed result to an AND calculator 235*c*.

Based on the value that is input from the OR calculator 235*e*, and information indicating whether the tag included in the status bit unit of the tag relating to block 0 is valid (hereinafter, "tag valid"), the AND calculator 235*c* performs an AND computation, and outputs the computed result to the AND calculator 230*c* shown in FIG. 9.

The AND calculator 235*d* receives the above mode signal and the enbblk [0], performs an AND computation based on the received values, and outputs the computed result to the OR calculator 235*e*. The OR calculator 235*e* receives the value of the result that is computed by the AND calculator 235*d*, and a value obtained by inverter the value of the mode signal, performs an OR computation based on the received values, and outputs the computed result to an AND calculator 235*f*.

The AND calculator 235*f* performs an AND computation based on the value of the result that is computed by the OR calculator 235*e*, and the tag valid from the tag status of block 1 of way 0, and outputs the computed result to the AND calculator 230*i* shown in FIG. 9. This example is the tag valid corresponding signal creator circuit relating to way 0, but similar tag valid corresponding signal creator circuits are used for ways 1 to 3. The tag valid corresponding signal creator circuits relating to ways 1 to 3 are not explained in this embodiment.

By setting the mode signals, the enbblk [n] signals, and signals relating to the validity/invalidity of each way, in the cache hit detector 230 beforehand, the cache capacity can be condensed without reducing the number of ways. By using signals that make the functions of the ways valid, the number of ways can be reduced and the cache capacity can be condensed in the conventional manner. In other words, a defect in any block of the cache memory can be dealt with by terminating the corresponding way or line, and condensing the cache capacity, as circumstances demand.

The data selector 240 receives information indicating whether the data from the cache hit detector 230 is hit, and, upon receiving information indicating a hit, searches the corresponding data from the storage unit 220 and passes the searched data to the processor 100. When no corresponding data exists in the storage unit 220, the data selector 240 sends a request for corresponding data to the main memory 300.

As described above, the cache memory 200 according to this embodiment, the cacheable memory access space 210 receives memory access addresses having different data structures, according to the status of use of the cache capacity, from the processor 100, and the cache memory 200 determines whether the data is hit based on a mode signal, an enbblk [n] signal, and a signal indicating whether the way is valid or invalid, these being set beforehand in the cache hit detector 230, a tag comparison address received from the cacheable memory access space 210, and a tag received from the storage unit 220. Therefore, the cache capacity can be condensed without reducing the number of ways, and reduction in performance during application can be prevented.

According to the present invention, there is obtained an access address that includes a line address, that represents the position of data requested by a processor, and a comparison address, that determines whether data specified by the line address is appropriate, based on the access address, and the status of each way, it is determined whether the data requested by the processor has been hit. Therefore, the cache capacity can be condensed without reducing the number of ways, preventing any reduction in performance during application.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cache memory that employs a set associative method including a plurality of ways and lines, and passes data to a processor according to a request from the processor, the cache memory comprising:

a holding unit that holds the ways divided into a plurality of blocks in each of the ways, each of the blocks including a plurality of tag information, wherein a first entry address of the tag information is formed as the entry address when an entire cache capacity of a way is used, and a second entry address of the tag information is formed as the entry address using a different bit from the first entry address without changing a region of the entry address that is used when one block of the way is disabled, the tag information including the entry address and a status bit, the entry address being compared with a tag comparison address that determines whether the data specified by the line address is valid, and the status bit unit including information indicating whether the tag information is valid;

an access-address acquiring unit that acquires an access address that includes a line address of a position of the data requested by the processor and the tag comparison address;

a cache hit detector that determines which one block of the way is exclusively enabled; and a determination processing unit that determines whether the data requested by the processor has been hit, based on statuses of the access address and a result of a determination by the cache hit detector.

2. The cache memory according to claim 1, wherein the line address includes specification information that specifies a block included in the way, and a single block from among the blocks included in the way is specified by the specification information.

3. The cache memory according to claim 1, wherein the determination processing unit specifies beforehand a way and a block to be used, according to a status of use of a cache capacity.

4. The cache memory according to claim 1, wherein an address configuration of the tag comparison address is changed according to a status of use of a cache capacity.

5. A method of controlling a memory that is applied to a cache memory that employs a set associative method including a plurality of ways and a plurality of lines, a plurality of blocks including a plurality of lines in each of the ways, and passes data to a processor according to a request from the processor, the method comprising:

holding the ways, that are divided into a plurality of blocks in each of the ways, in a holding unit, each of the blocks including a plurality of tag information, and a first entry address of the tag information is formed as the entry address when an entire cache capacity of a way is used, and a second entry address of the tag information is formed as the entry address using a different bit from the first entry address without changing a region of the entry address that is used when one block of the way is disabled, the tag information including the entry address and a status bit, the entry address being compared with a tag comparison address that determines whether the data specified by the line address is valid, and the status bit including information indicating whether the tag information is valid;

acquiring an access address that includes a line address of a position of the data requested by the processor, and the tag comparison address;

determining which one block of the way is -exclusively enabled without reducing the number of ways;

determining whether the data requested by the processor has been hit, based on statuses of the access address and a result of a determination of which one block of the way is exclusively -enabled;

searching the data requested by the processor from the cache memory when the data requested by the processor has been hit; and passing the data searched to the processor.

* * * * *